(12) United States Patent
Lee et al.

(10) Patent No.: US 7,912,050 B2
(45) Date of Patent: Mar. 22, 2011

(54) METHOD FOR CLASSIFYING DOWNSTREAM PACKET IN CABLE MODEM TERMINATION SYSTEM AT HEAD-END SUPPORTING CHANNEL BONDING MODE, AND CABLE MODEM TERMINATION SYSTEM

(75) Inventors: Ho Sook Lee, Daejeon (KR); Dong Joon Choi, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 443 days.

(21) Appl. No.: 11/944,192

(22) Filed: Nov. 21, 2007

(65) Prior Publication Data
US 2008/0130641 A1    Jun. 5, 2008

(30) Foreign Application Priority Data

Dec. 5, 2006    (KR) .................. 10-2006-0122509
Apr. 23, 2007   (KR) .................. 10-2007-0039185

(51) Int. Cl.
*H04L 12/28* (2006.01)
(52) U.S. Cl. .................. 370/389; 370/235; 370/392
(58) Field of Classification Search .................. 370/229, 370/235, 389, 392, 395.42, 464, 474
See application file for complete search history.

(56) References Cited

U.S. PATENT DOCUMENTS

| | | | | |
|---|---|---|---|---|
| 5,920,886 A | * | 7/1999 | Feldmeier | 711/108 |
| 6,788,683 B1 | * | 9/2004 | Ikeda et al. | 370/389 |
| 7,110,398 B2 | | 9/2006 | Grand et al. | |
| 2002/0062394 A1 | * | 5/2002 | Bunn et al. | 709/246 |
| 2002/0093955 A1 | | 7/2002 | Grand et al. | |
| 2003/0041266 A1 | * | 2/2003 | Ke et al. | 713/201 |
| 2005/0005023 A1 | * | 1/2005 | Dobbins et al. | 709/238 |
| 2006/0072565 A1 | * | 4/2006 | Yazaki et al. | 370/389 |
| 2006/0221990 A1 | * | 10/2006 | Muller et al. | 370/412 |

FOREIGN PATENT DOCUMENTS

| | | |
|---|---|---|
| EP | 1404057 | 3/2004 |
| JP | 2004-343460 | 12/2004 |
| KR | 2002-0044665 | 6/2002 |
| KR | 2003-0037803 | 5/2003 |
| KR | 20060068277 | 6/2006 |
| KR | 2007-0013984 | 1/2007 |

* cited by examiner

*Primary Examiner* — Dang T Ton
*Assistant Examiner* — Robert M Morlan
(74) *Attorney, Agent, or Firm* — Rabin & Berdo, PC

(57) ABSTRACT

Provided is a method for classifying packets in a cable modem termination system (CMTS) supporting a channel bonding mode. The method includes the steps of: extracting a destination Media Access Control (MAC) address of a received data packet; acquiring a MAC address of a cable modem receiving the data packet, and memory address information of a cable modem Classifier Identifier (CLID) corresponding to the MAC address of the cable modem, from a first classification table corresponding to the destination address; extracting the CLID information present in the memory address; extracting a classifier pattern corresponding to the extracted cable modem CLID information; bonding the MAC address of the cable modem and the classifier pattern to generate a result pattern; extracting a memory address including downstream service flow information from a second classification table corresponding to the result pattern; extracting the downstream service flow information corresponding to the memory address; and generating an output packet corresponding to the downstream service flow information and the data packet.

18 Claims, 5 Drawing Sheets

FIG. 4

(401) first classification table

| input packet MAC address | cable modem classifier table address |
|---|---|
| cm1 | 0xee080000 |
| cm2 | 0xee080008 |
| cm3 | ... |
| cm4 | |
| cm5 | |
| cpe1 | 0xee09ee06 |
| cpe2 | ... |
| cpe3 | |
| cpe4 | |
| gmac1 | |
| gmac2 | |
| gmac3 | |

(403) cable modem classifier table

| cable modem MAC | classifier identifier (CLIDs) |
|---|---|
| cm1 | 5,2,3 |
| cm2 | 7,2 |
| cm3 | - |
| ... | |

(405) classifier pattern table

| pattern1 | → | cable modem MAC address |
| pattern2 | | |
| pattern3 | | |

Matching Value (409) second classification table

| cable modem MAC + matched value | downstream service flow table address |
|---|---|
| cm1 + str1 | |
| cm1 + str2 | |
| cm2 + str1 | |
| cm3 | |
| ... | |

(411) downstream service flow table

| DS SFID | cable modem MAC | DSID | DC Lists | Pkt TYPE | Priority | QoS Class |
|---|---|---|---|---|---|---|
| sfid1 | cm1 | 3 | 0x000D | 1 | 1 | 1 |
| sfid2 | cm2 | 4 | 0x004E | 1 | 2 | |
| sfid3 | cm3 | null | 0x0002 | 3 | 0 | |
| sfid4 | cm4 | 6 | 0x0020 | 2 | 0 | |
| sfid5 | cm5 | 7 | 0x0040 | 2 | 1 | |
| ... | | | | | | |

(413) downstream QoS attribute table

| QoS Class | Max susR | Max Burst | Min RrvR | Ass.Min RrvR | Max. Latency | Peak Rage |
|---|---|---|---|---|---|---|
| 1 | | | | | | |
| 2 | | | | | | |
| 3 | | | | | | |
| ... | | | | | | |

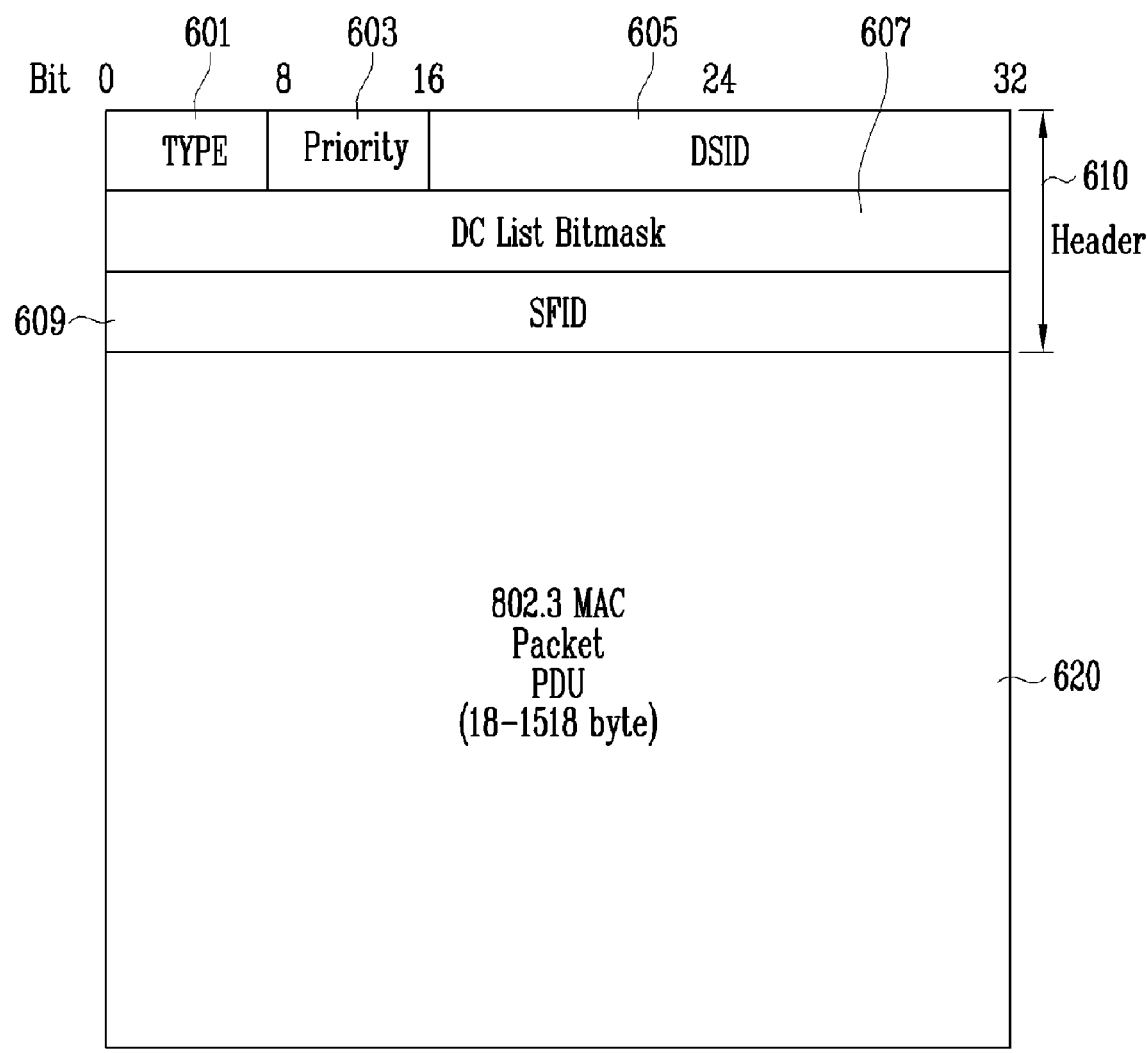

METHOD FOR CLASSIFYING DOWNSTREAM PACKET IN CABLE MODEM TERMINATION SYSTEM AT HEAD-END SUPPORTING CHANNEL BONDING MODE, AND CABLE MODEM TERMINATION SYSTEM

CROSS-REFERENCE TO RELATED APPLICATION

This application claims priority to and the benefit of Korean Patent Application No. 2006-122509, filed Dec. 5, 2006, and No. 2007-39185, filed Apr. 23, 2007, the disclosure of which is incorporated herein by reference in its entirety.

BACKGROUND

1. Field of the Invention

The present invention relates to a method for classifying downstream packets in a Media Access Control (MAC) layer of a Cable Modem Termination System (CMTS) at a head-end of the Data over Cable Service Interface Specification (DOCSIS) standard supporting a channel bonding mode.

The present invention has been produced from the work supported by the IT R&D program of MIC (Ministry of Information and Communication)/IITA (Institute for Information Technology Advancement) [2006-S-019-01, The Development of Digital Cable Transmission and Receive System for 1 Gbps Downstream] in Korea.

2. Discussion of Related Art

In order to transmit downstream data packets input to the CMTS at a head-end through a network interface in a cable network conforming to the DOCSIS standard to a specific cable modem, the packets must be transmitted to a channel through which the corresponding cable modem can receive. The downstream channel allowing the packets to be transmitted to the corresponding cable modem may be a single channel, or may be a plurality of channels when channel bonding is supported. The downstream packets are classified by their service flows depending on their Quality of Service (QoS) and then scheduled onto channels allowing them to be transmitted to the cable modem.

Accordingly, the CMTS must allocate service flows according to the QoS, define and manage classifiers capable of classifying the service flows, and schedule data packets input through downstream service flows onto transmission channels capable of rapidly and effectively delivering the packets to the cable modem in accordance with predefined classification rules.

SUMMARY OF THE INVENTION

The present invention is directed to a method for classifying downstream packets in a CMTS at a head-end supporting a channel bonding mode.

The present invention is also directed to a method for searching for a cable modem to which data packets are transmitted using a destination MAC address of the data packets input to the CMTS from a network interface, and classifying the packets input according to a service flow-dependent classification rule of the corresponding cable modem to be delivered through a downstream channel.

One aspect of the present invention provides a method for classifying downstream packets in a cable modem termination system (CMTS) supporting a channel bonding mode, the method comprising the steps of: extracting a destination Media Access Control (MAC) address of a received data packet; acquiring a MAC address of a cable modem receiving the data packet, and memory address information of a cable modem Classifier Identifier (CLID) corresponding to the MAC address of the cable modem, from a first classification table corresponding to the destination address; extracting the CLID information present in the memory address; extracting a classifier pattern corresponding to the extracted cable modem CLID information; bonding the MAC address of the cable modem and the classifier pattern to generate a result pattern; extracting a memory address including downstream service flow information from a second classification table corresponding to the result pattern; extracting the downstream service flow information corresponding to the memory address; and generating an output packet corresponding to the downstream service flow information and the data packet.

The first and second classification tables may be stored in a Content Addressable Memory (CAM) type memory. In addition, the data packet may be generated as an output packet corresponding to the service flow information for broadcasting when the memory address information of the cable modem CLID corresponding to the MAC address of the cable modem cannot be acquired from the first classification table.

In addition, the method may further comprise the steps of: bonding the MAC address of the cable modem and a Null classifier pattern to generate a result pattern when the classifier pattern corresponding to the extracted CLID information is not present; extracting a memory address including downstream service flow information from the second classification table corresponding to the result pattern; and extracting the downstream service flow information corresponding to the memory address. In addition, the data packet may be generated as an output packet corresponding to the service flow information for broadcasting when the downstream service flow information is not present in the second classification table corresponding to the result pattern.

In addition, when the downstream service flow information is not present in the second classification table corresponding to the result pattern, it may be checked whether the CLID of the next priority is present in the result pattern, and the result pattern of the CLID of the next priority may be extracted when the CLID of the next priority is present.

In addition, the method may further comprise the steps of: checking whether the CLID of the next priority is present in the result pattern, and bonding the MAC address of the cable modem and a Null classifier pattern to generate a result pattern when the CLID of the next priority is not present; extracting a memory address including the downstream service flow information from the second classification table corresponding to the result pattern; and extracting the downstream service flow information corresponding to the memory address. In addition, the cable modem CLID information, the classifier pattern, and the downstream service flow information may be predetermined corresponding to the MAC address of the cable modem, the cable modem CLID, and the result pattern, respectively. In addition, the downstream service flow information may comprise a service flow identifier (SFID), a cable modem MAC address, a downstream service identifier (DSID), a downstream channel (DS) list, a packet type, a priority, and a QoS.

In addition, the QoS may comprise a maximum sustained traffic rate, a minimum reserved traffic rate, an assumed minimum reserved traffic rate, a maximum latency, and a peak range. In addition, the first classification table, the second classification table, the cable modem CLID information, the classifier pattern, and the downstream service flow information may be changed by provisioning an initial registration procedure of the cable modem, a dynamic service change, and address learning through specification data packet monitoring.

Another aspect of the present invention provides a CMTS, comprising: a downstream packet classifier receiving a data packet, classifying the data packet according to a provisioned classification rule of a service flow, and generating an output packet; a first classification table and a second classification table referred to in searching for service flow information corresponding to the received data packet in the downstream packet classifier; and a general memory for extracting the service flow information by referring to the first and second classification tables.

In exemplary embodiments, the general memory may comprise a CLID table, a classifier pattern table, a downstream service flow table, and a QoS table. In addition, the first and second classification table memories may be content addressable memory (CAM) type memories.

Yet another aspect of the present invention provides a method for classifying downstream packets, the method comprising the steps of: extracting a destination address of a received data packet; and acquiring downstream service flow information of the data packet corresponding to the destination address to generate an output packet.

The method may further comprise the steps of: acquiring address information of a memory including intermediate identifier information in the first classification table corresponding to the destination address; acquiring address information of a memory including the downstream service flow information in a second classification table corresponding to the intermediate identifier information; and extracting the downstream service flow information corresponding to the memory address of the second classification table. In addition, the intermediate identifier information may be a result pattern in which a classifier pattern corresponding to the CLID information of the cable modem and the MAC address of the cable modem are bonded to each other.

Still another aspect of the present invention provides a computer-readable recording medium in which a program for classifying downstream packets is recorded, and the program comprises a program for executing one of the above inventive methods.

Yet another aspect of the present invention provides an apparatus including a memory and capable of carrying out operations, the apparatus comprising: a processing unit; and a memory storage connected to the processing unit, wherein the memory storage is suitable for storing a plurality of instructions for executing one of the above inventive methods.

BRIEF DESCRIPTION OF THE DRAWINGS

The above and other objects, features and advantages of the present invention will become more apparent to those of ordinary skill in the art by describing in detail exemplary embodiments thereof with reference to the attached drawings in which:

FIG. 4 is a diagram illustrating various tables referred to by a downstream packet classifier according to an exemplary embodiment of the present invention;

FIG. 6 is a diagram of a header portion to be added to a downstream packet classifier according to an exemplary embodiment of the present invention.

DETAILED DESCRIPTION OF EXEMPLARY EMBODIMENTS

Exemplary embodiments of the present invention will now be described more fully hereinafter with reference to the accompanying drawings.

Figure 1:
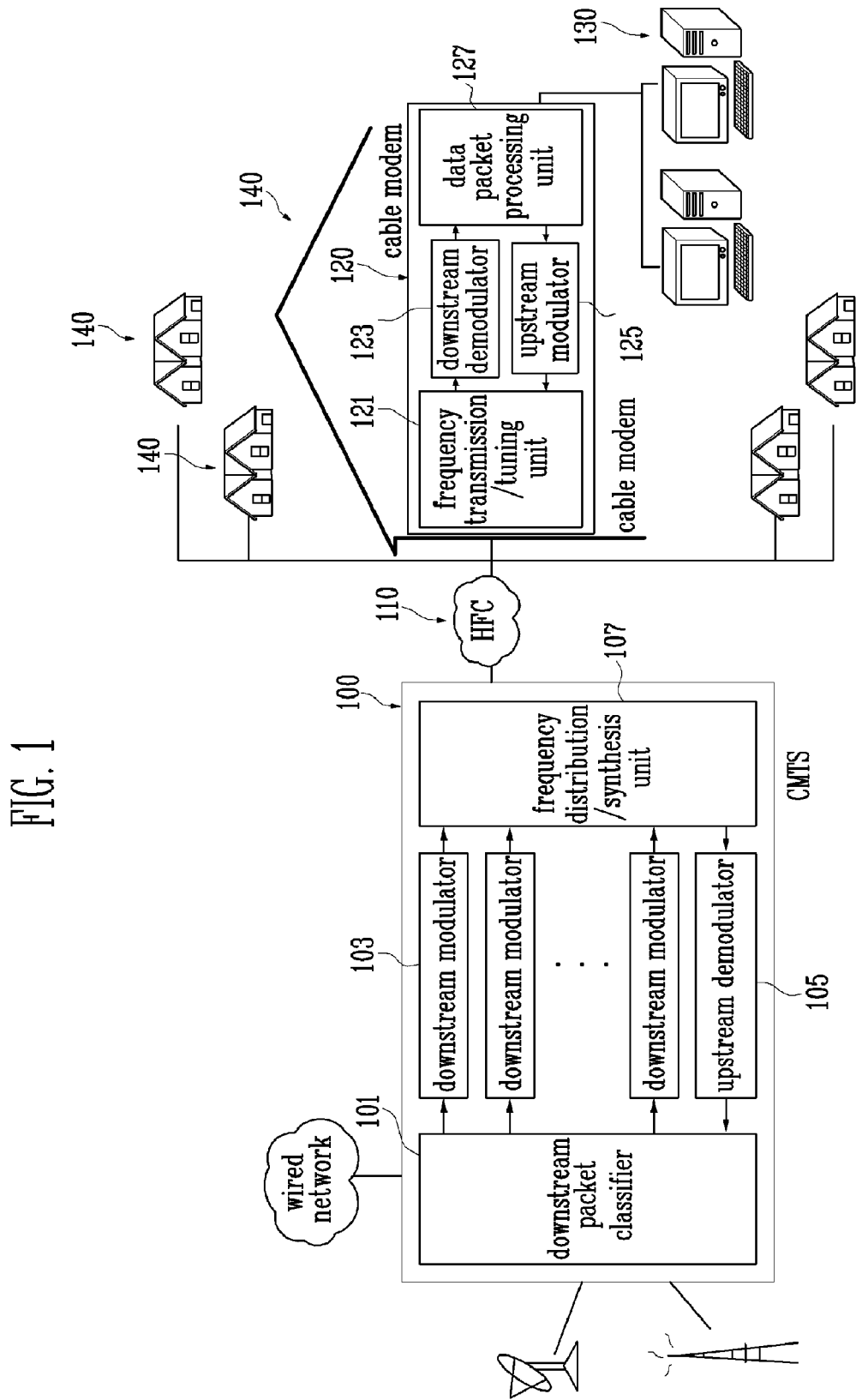
FIG. 1 is a diagram illustrating the configuration of a cable network to which the present invention is applied.

FIG. 1 is a diagram illustrating the configuration of a cable network to which the present invention is applied.

Referring to FIG. 1, the cable network of the present invention receives data in a Cable Modem Termination System (CMTS) 100 within a head-end of the cable network and delivers them to subscriber premises 140 via a Hybrid Fiber Coaxial cable (HFC) 110. In the case of the CMTS supporting channel bonding according to the present invention, data packets input via the network are classified according to priority through a downstream packet classifier 101 and the classified data packets are distributed to several channels by a scheduler.

Each data packet is transmitted to the HFC 110 through a frequency distribution/synthesis unit 107 and then is transmitted to the cable modem 120 of the subscriber premises 140.

A frequency transmission/tuning unit 121 of the cable modem 120 which has received the data packet receives the transmitted signal, and a downstream demodulator 123 of the cable modem demodulates the modulated signal. A data packet processing unit 127 of the cable modem then transmits the data packet to a data receiving terminal 130 of the subscriber premises.

In the case of upstream transmission, an upstream modulator 125 of the cable modem and an upstream demodulator 105 of the CMTS carry out reverse operations of the downstream transmission procedure.

In this manner, one CMTS operates in communication with several cable modems. However, in the case of a channel bonding mode, each cable modem does not use the same channel, and packets must be classified by the downstream packet classifier 101 of the CMTS when the cable modem is initialized.

Figure 2:
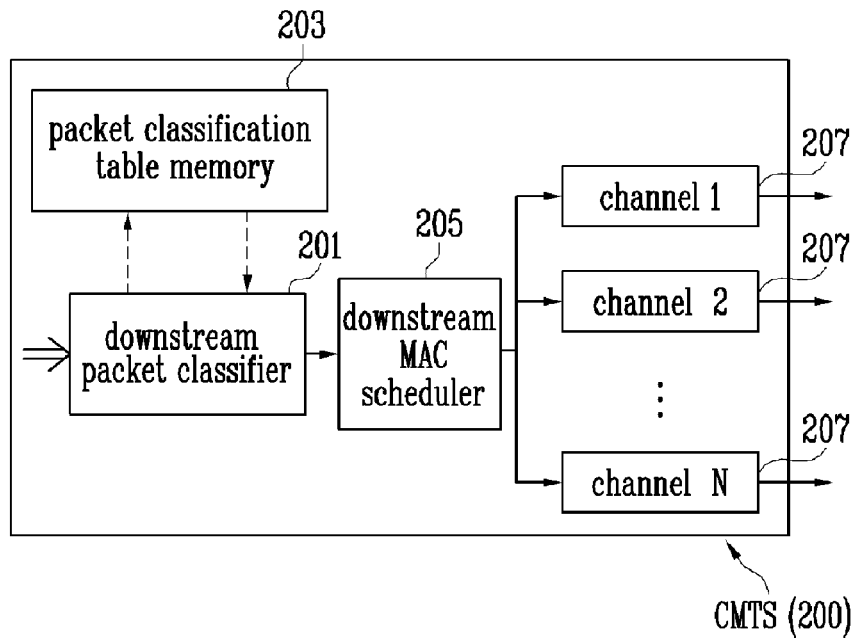
FIG. 2 is a diagram schematically illustrating a procedure of processing downstream data packets in a CMTS according to an exemplary embodiment of the present invention.

FIG. 2 is a diagram schematically illustrating a procedure of processing downstream data packets in a CMTS according to an exemplary embodiment of the present invention.

Referring to FIG. 2, a downstream packet classifier 201, upon receipt of the data packets, refers to data information included in a memory 203 having packet classification tables, adds the classification information thereto in accordance with a predefined service flow in the input data packets, and transmits the data packets with the added classification information to a downstream MAC scheduler 205.

The downstream packet classifier 201 sets a new header for the input packet to include classification information of the data packet within the header. In addition, the information included to the header according to the service flow set by the downstream packet classifier 201 includes, whether the channel bonding is used, a collection of channels allowing the transmission, a Downstream Service Identifier (DSID), a Service Flow Identifier (SFID), and priority information.

The downstream MAC packet scheduler 205 determines channels of the data packets transmitted from a downstream service flow processing unit 301 based on the packet type, the DSID to which the packets belong, the priority, and the collection of channels, and then delivers the data packets.

Accordingly, the data packets are distributed and transmitted to channels 207, and then transmitted in accordance with the priority per channel 207, and thus can be effectively transmitted in the channel bonding mode.

Figure 3:
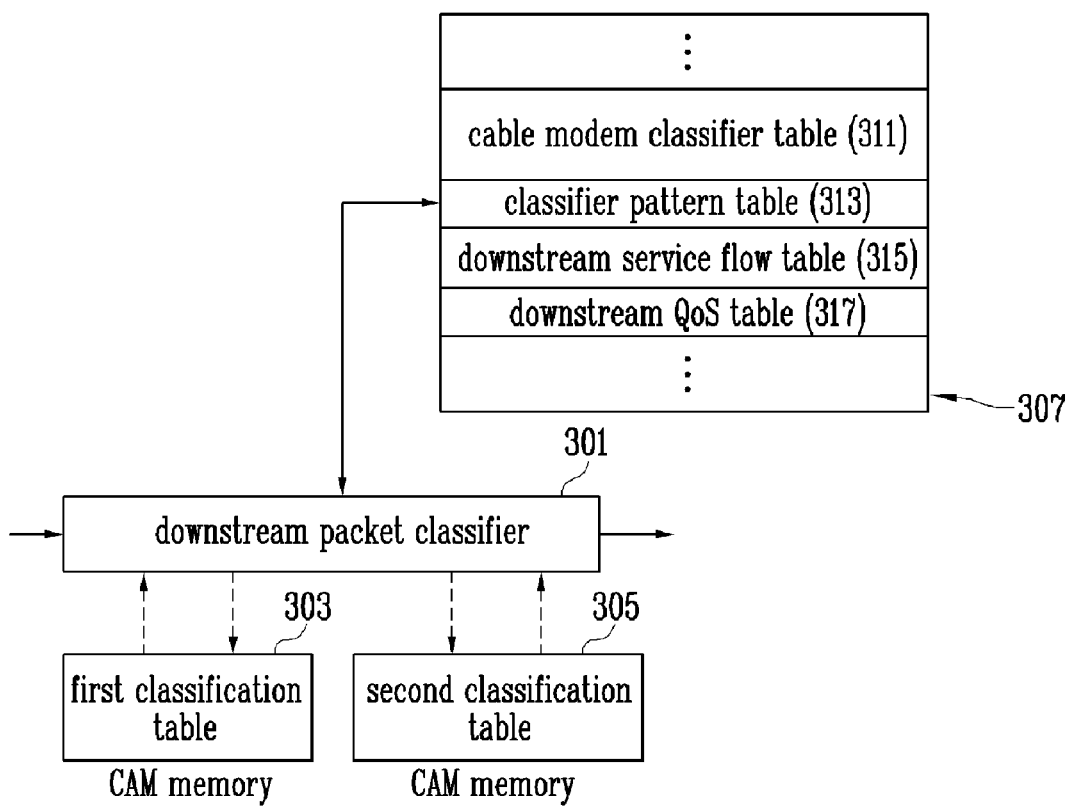
FIG. 3 is a diagram schematically illustrating the structure of a downstream packet classifier according to an exemplary embodiment of the present invention.

FIG. 3 is a diagram schematically illustrating the structure of a downstream packet classifier according to an exemplary embodiment of the present invention.

Referring to FIG. 3, the downstream packet classifier 301 classifies packets in accordance with predefined classification rules of the service flow with respect to the input data packets, adds the classification information to the internal header information of the packets, and transmits them to the downstream MAC scheduler 205.

Here, in order to classify the input data packets according to the corresponding service flow, a first classification table 303 and a second classification table 305 are referred to in the present invention. The first and second classification tables may be embodied as Content Addressable Memory (CAM) type memories which can be referred to rapidly.

Information included in a memory 307 can be found faster by referring to the first and second classification tables. The information included in the general memory 307 includes a cable modem Classifier Identifier (CLID) table 311, a classifier pattern table 313, a downstream service flow table 315, and a downstream QoS table 317.

These tables have predetermined values according to the MAC addresses of data packet destinations, MAC addresses of the cable modem and service flow information. The first and second classification tables and the MAC addresses included in the data packets are used to determine SFIDs corresponding to the data packets, priorities of the packets to be transmitted, and the respective channels.

FIG. 4 is a diagram illustrating various tables referred to by a downstream packet classifier according to an exemplary embodiment of the present invention.

Referring to FIG. 4, tables referred to by the downstream packet classifier include a first classification table 401, a second classification table 409, a cable modem CLID table 403, a classifier pattern table 405, a downstream service flow table 411, and a downstream QoS table 413.

These tables are referred to such that a MAC address 423 of the cable modem through which input packets are transmitted and a CLID address 425 according to the cable modem MAC address of the CLID table 403 stored in the general memory are first found by referring to the first classification table 401 through the destination MAC address 421 of the data packet included in the input data packet. CLID information 427 corresponding to the MAC address 425 of the cable modem is then acquired by referring to the CLID table 403 stored in the general memory according to the CLID address 425 of the cable modem found in the first classification table 401. Such CLID information 427 indicates a location of the classifier pattern table 403, and has a value ranging from 0 to 63556.

When such CLID information 427 is acquired, a classifier pattern value applied to the service flow according to each packet is then acquired. This classifier pattern has a pattern value composed of bits according to a predefined grammar in the DOCSIS standard in accordance with the QoS of the service flow.

When the classifier pattern is acquired by such CLID information 427, a result pattern 407 corresponding to the MAC address 423 of the cable modem and the CLID information 427 is generated, and the second classification table 409 is referred to by using the result pattern 407.

A memory address 429 of the downstream service flow information according to the result pattern 407 of the downstream service flow table 411 included in the general memory can be found in accordance with the result pattern 407 in the second classification table 409.

The memory address 429 is used to acquire the downstream service flow information complying with the result pattern 407 in the downstream service flow table 411 stored in the general memory.

The downstream service flow information includes an SFID, a cable modem MAC address, a DSID, a DS list, a packet type, a priority, and a QoS. And, the information included in the QoS is provided in detail by the downstream QoS attribute table 413, and may include a maximum sustained traffic rate, a minimum reserved traffic rate, an assumed minimum reserved traffic rate, a maximum latency, and a peak range. However, the information is not limited thereto, and a field may be added thereto as a new pattern grammar by additionally defining a QoS if necessary.

Figure 5:
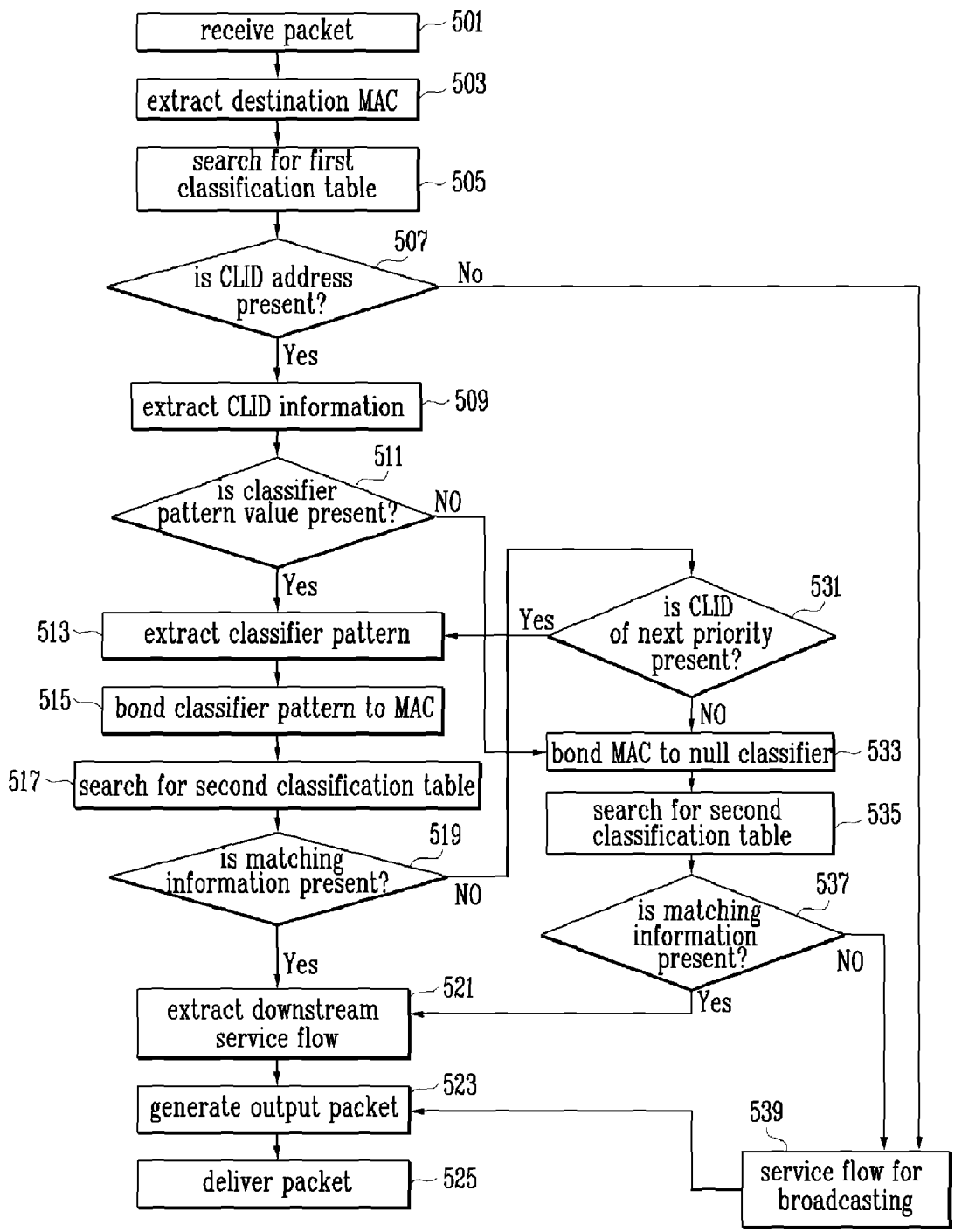
FIG. 5 is a flowchart illustrating the operation order of a downstream packet classifier according to an exemplary embodiment of the present invention.

FIG. 5 is a diagram illustrating the operation order of a downstream packet classifier according to an exemplary embodiment of the present invention.

Referring to FIG. 5, a packet is first received (step 501). A destination MAC address included in the packet is then extracted (step 503). The destination MAC address is then used to refer to the first classification table (step 505). When the destination MAC address of the packet is known, as can be seen in FIG. 4, the MAC address of the cable modem where the packet is to be transmitted and the address of the memory in which the CLID information is included can be seen in the first classification table.

When the address information of the CLID is acquired by the first classification table, it is checked whether the CLID is present by referring to the address (step 507), and the CLID is extracted when it is present (step 509). The CLID indicates the location of the corresponding classifier pattern value. Accordingly, the CLID is used to check whether the classifier pattern value is present (step 511), and the classifier pattern value can be extracted when it is present (step 513).

The extracted classifier pattern value and the MAC address of the cable modem are then bonded to each other (step 515). The bonded result pattern is used to search for the second classification table. When the result pattern is known, the address of the SFID can be seen from the second classification table, as can be seen in FIG. 4.

When the address of the SFID is extracted from the second classification table, it is checked whether the information matching the address is present (step 521), and corresponding downstream service flow information is extracted when the information is present (step 521). The extracted downstream service flow information is then used to add a new header to the input data packet, thereby generating an output packet (step 523) and delivering the generated output packet outward (step 525).

Meanwhile, when the classifier pattern value is not present in step 511, the MAC address of the cable modem and a Null classifier are bonded to each other to generate a result pattern (step 533), and the result pattern is used to search for the second classification table (step 535). At this time, the procedure goes back to step 521 to extract the downstream service flow information when matching information is present or to generate an output packet in accordance with the service flow information for broadcasting when the matching information is not present (step 539).

In addition, when information matching the address value of the second classification table is not present in step 519, it is checked whether cable modem CLID information of the next priority among the cable modem CLID information is present (step 531). The procedure starts again from step 513 when cable modem CLID information of the next priority is present, and otherwise goes to step 533.

In addition, when the CLID information is not present in step 507, the procedure goes to step 539 to generate a service flow for broadcasting.

FIG. 6 is a diagram illustrating a header portion to be added in a downstream packet classifier according to an exemplary embodiment of the present invention.

Referring to FIG. 6, the data packet received by the downstream service flow processing unit includes an 802.3 MAC packet 620. This is a data transmission standard established by the IEEE.

When the data packet is received, the downstream service flow processing unit adds a header 610 to be used within a data packet processing device to the packet.

The header 610 includes a data type portion 601 determining the transmission method of the data packet, a priority portion 603 indicating a priority of the data packet, a DSID portion 605 indicating the downstream channel allowing the packet to be transmitted, a list mark portion 607 indicating a list of the downstream channel through which the packet is transmitted, and an SFID portion 609 indicating the service flow corresponding to the packet.

The data type portion 601 is composed of 8 bits and the priority portion 603 is composed of 4 bits.

The priority portion 603 has values of 0 to 7 and higher values mean higher priority.

The DSID portion 605 is composed of 24 bits and is an identifier indicating the collection of downstream channels allowing the packet to be transmitted in the service flow processing unit.

The list mark portion 607 is composed of bits corresponding in number to the downstream channels and indicates the list of downstream channels (DCs). Each bit indicates one channel. For example, when the $8^{th}$ of 32 downstream channels is to be included, there are 32 bits and the $8^{th}$ bit is "1".

The SFID portion 609 is the identifier of the service flow of the input packet.

According to the present invention, a method for classifying downstream packets in the CMTS of a head-end supporting channel bonding can be provided.

In addition, according to the present invention, a method for searching for a cable modem to which data packets are to be transmitted using a destination MAC address of the data packets input to the CMTS from a network interface, classifying the input packets according to service flow-dependent classification rules of the corresponding cable modem into specific service flows complying with QoS, and delivering the packets through downstream channels can be provided.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for classifying downstream packets in a channel bonding mode, comprising the steps of:
   extracting a destination Media Access Control (MAC) address of a received data packet;
   acquiring a MAC address of a cable modem receiving the data packet, and address information of a memory including a plurality of cable modem Classifier Identifiers (CLIDs) that correspond to the MAC address of the cable modem, from a first classification table corresponding to the destination address;
   extracting the cable modem CLIDs present in the memory address;
   extracting a classifier pattern corresponding to an extracted cable modem CLID of the extracted cable modem CLIDs;
   bonding the MAC address of the cable modem and the classifier pattern to generate a result pattern;
   extracting a memory address including downstream service flow information from a second classification table corresponding to the result pattern;
   extracting the downstream service flow information corresponding to the memory address; and
   generating an output packet corresponding to the downstream service flow information and the data packet.

2. The method according to claim 1, wherein the first classification table and the second classification table are stored in a Content Addressable Memory (CAM) type memory.

3. The method according to claim 1, wherein the data packet is generated as an output packet corresponding to the service flow information for broadcasting when the memory address information of the cable modem CLIDs corresponding to the MAC address of the cable modem cannot be acquired from the first classification table.

4. The method according to claim 1, further comprising the steps of:
   bonding the MAC address of the cable modem and a Null classifier pattern to generate a result pattern when the classifier pattern corresponding to the extracted cable modem CLID is not present;
   extracting a memory address including downstream service flow information from the second classification table corresponding to the result pattern; and
   extracting the downstream service flow information corresponding to the memory address.

5. The method according to claim 4, wherein the data packet is generated as an output packet corresponding to the service flow information for broadcasting when the downstream service flow information is not present in the second classification table corresponding to the result pattern.

6. The method according to claim 1, wherein when the downstream service flow information is not present in the second classification table corresponding to the result pattern, it is checked whether a CLID of a next priority is present among the extracted cable modem CLIDs, and a result pattern of the CLID of the next priority is extracted when it is present.

7. The method according to claim 6, further comprising the steps of:
   checking whether the CLID of the next priority is present among the extracted cable modem CLIDs, and bonding the MAC address of the cable modem and a Null classifier pattern to generate a result pattern when the CLID of the next priority is not present;
   extracting a memory address including the downstream service flow information from the second classification table corresponding to the result pattern; and
   extracting the downstream service flow information corresponding to the memory address.

8. The method according to claim 1, wherein the cable modem CLIDs, the classifier pattern, and the downstream service flow information are predetermined corresponding to the MAC address of the cable modem, the extracted cable modem CLID, and the result pattern, respectively.

9. The method according to claim 1, wherein the downstream service flow information comprises a service flow identifier (SFID), a cable modem MAC address, a downstream service identifier (DSID), a downstream channel (DS) list, a packet type, a priority, and a quality of service (QoS).

10. The method according to claim 9, wherein the QoS comprises a maximum sustained traffic rate, a minimum reserved traffic rate, an assumed minimum reserved traffic rate, a maximum latency, and a peak range.

11. The method according to claim 1, wherein the first classification table, the second classification table, the cable modem CLIDs, the classifier pattern, and the downstream service flow information can be changed by presetting, an initial registration procedure of the cable modem, a dynamic service change, and address learning through specification data packet monitoring.

12. A cable modem termination system (CMTS), comprising:
a downstream packet classifier receiving a data packet, classifying the data packet according to a predefined classification rule of a service flow, and generating an output packet;
a first classification table memory and a second classification table memory referred to in searching for service flow information corresponding to the received data packet in the downstream packet classifier, the second classification table memory including a plurality of records, each record comprising a MAC address of a cable modem bonded to a classifier pattern, and an address of corresponding service flow information; and
a general memory for extracting the service flow information by referring to the first and second classification tables, the general memory comprising a classifier identifier (CLID) table including a plurality of CLID records, each CLID record comprising a MAC address of a cable modem and a plurality of classifier identifiers corresponding to the MAC address of the cable modem.

13. The CMTS according to claim 12, wherein the general memory further comprises a classifier pattern table, a downstream service flow table and a quality of service (QoS) table.

14. The CMTS according to claim 12, wherein the first and second classification table memories are content addressable memory (CAM) type memories.

15. A method for classifying downstream packets in a channel bonding mode, comprising the steps of:
extracting a destination address of a received data packet;
acquiring address information of a classifier identifier memory including address information of intermediate identifier information, from a first classification table corresponding to the destination address, the classifier identifier memory including a plurality of classifier identifiers corresponding to the destination address, the intermediate identifier information being a classifier pattern corresponding to one of the plurality of classifier identifiers;
acquiring address information of a memory including the downstream service flow information, from a second classification table corresponding to the intermediate identifier information bonded to the destination address;
extracting the downstream service flow information corresponding to the memory address of the second classification table; and
acquiring downstream service flow information of the data packet corresponding to the destination address to generate an output packet.

16. The method according to claim 15, wherein the classifier identifiers are cable modem Classifier Identifiers (CLIDs) of a cable modem and the destination address is a MAC address of the cable modem.

17. A non-transitory computer-readable recording medium in which a program for classifying downstream packets is recorded, the medium being executed by a processor, the program comprising: a program for executing the method of claim 1.

18. An apparatus including a memory and capable of carrying out operations, comprising:
a processing unit; and
the memory connected to the processing unit,
wherein the memory is suitable for storing a plurality of instructions for executing the method of claim 1.

* * * * *